April 24, 1951 M. H. SWEET 2,550,648
SPEED CONTROL FOR RECORDING DENSITOMETERS
Filed May 2, 1945 4 Sheets-Sheet 1

INVENTOR.
MONROE H. SWEET
BY
ATTORNEYS

April 24, 1951 M. H. SWEET 2,550,648
SPEED CONTROL FOR RECORDING DENSITOMETERS
Filed May 2, 1945 4 Sheets-Sheet 2
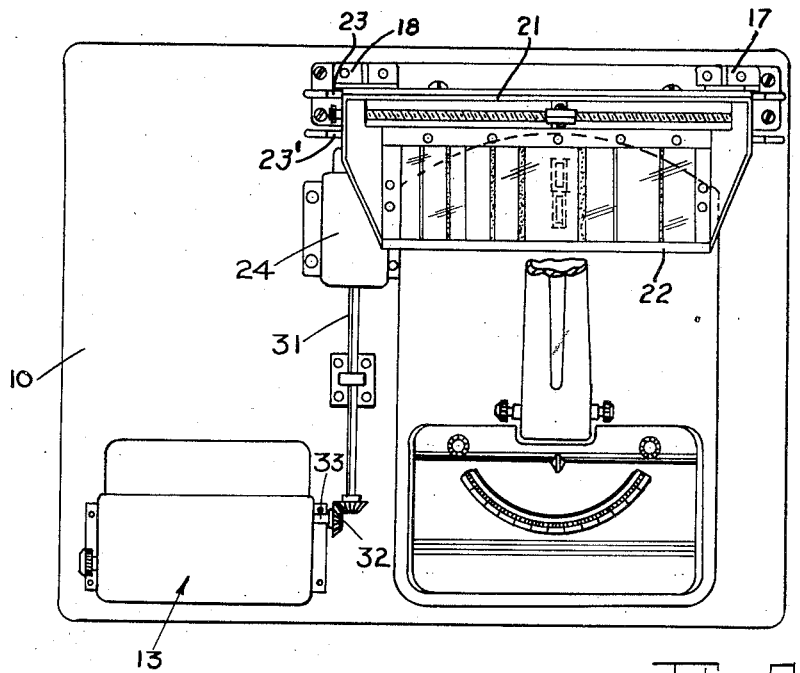
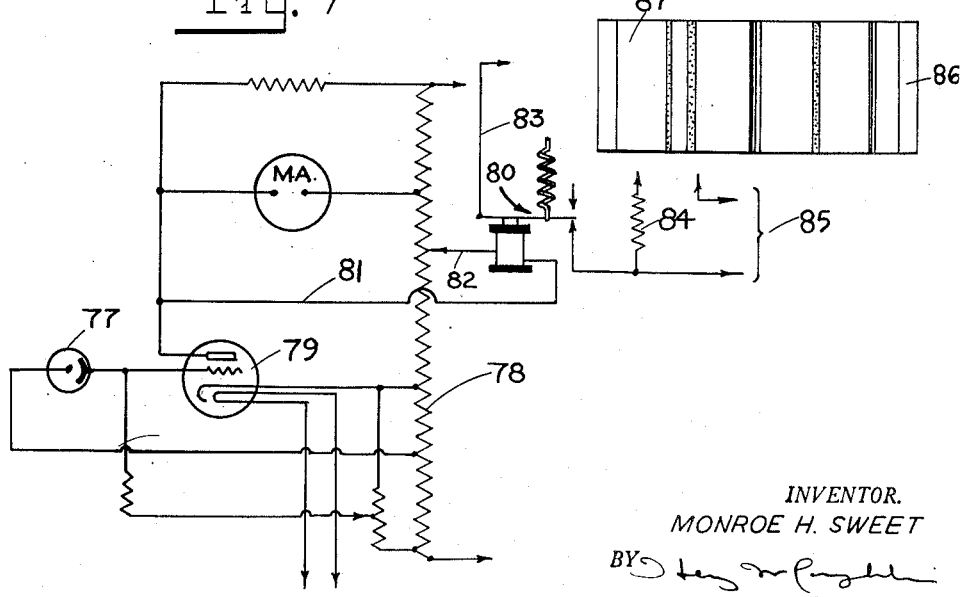
INVENTOR.
MONROE H. SWEET
ATTORNEYS

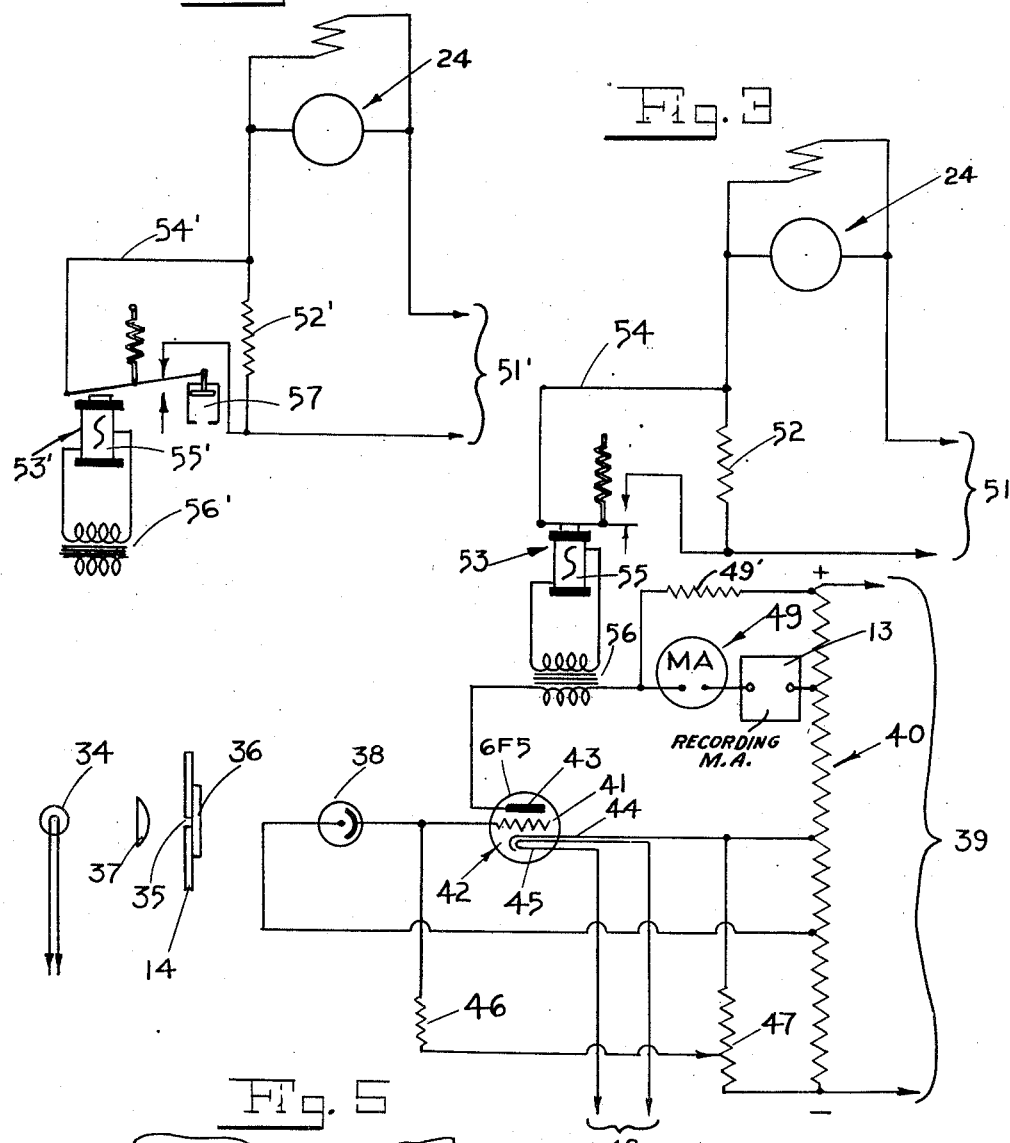

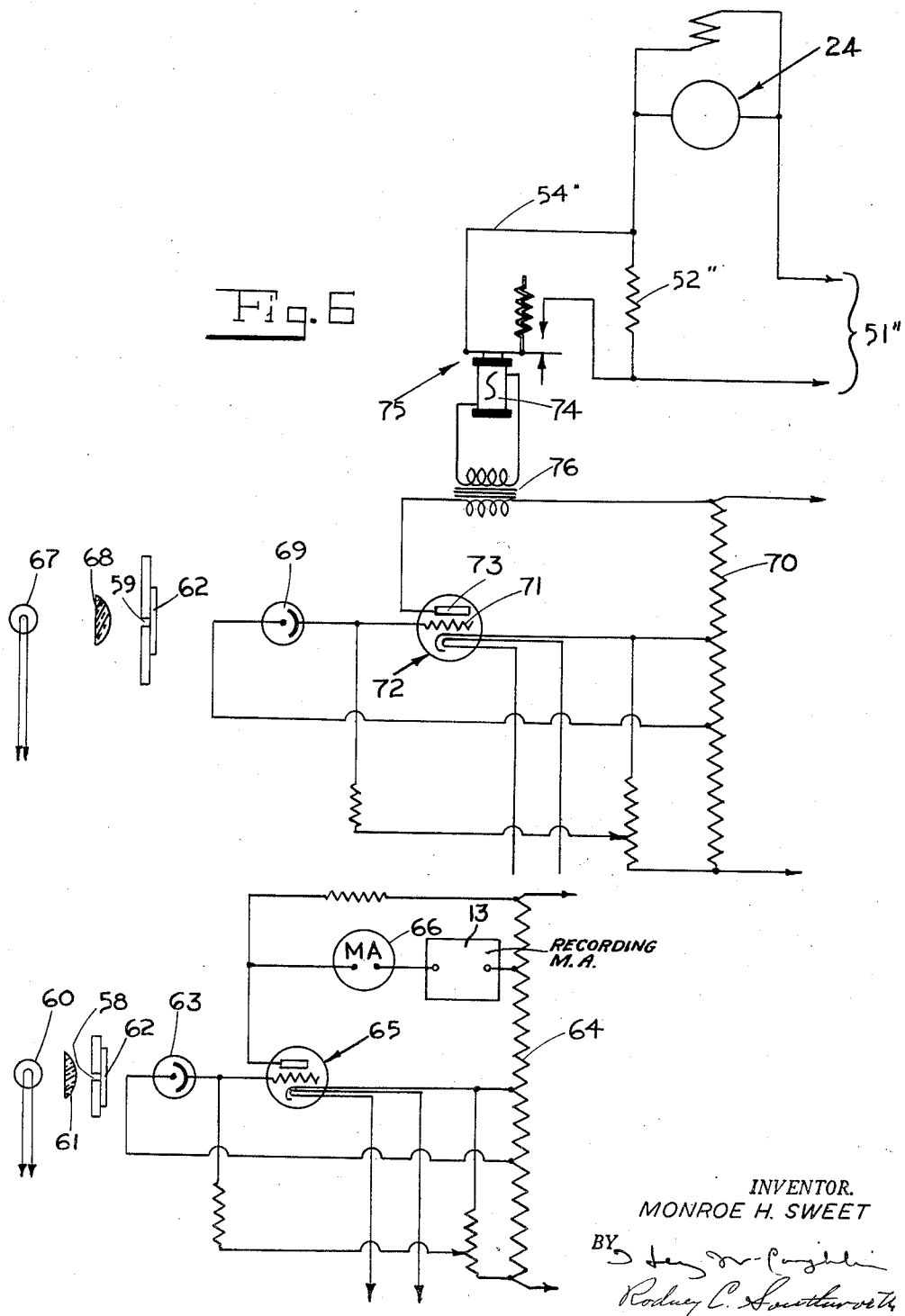

UNITED STATES PATENT OFFICE 2,550,648

SPEED CONTROL FOR RECORDING DENSITOMETERS

Monroe H. Sweet, Binghamton, N. Y., assignor to General Aniline & Film Corporation, New York, N. Y., a corporation of Delaware Application May 2, 1945, Serial No. 591,495

14 Claims. (Cl. 346—33)

This invention pertains to recording densitometers or micro-densitometers in which the specimen, the density of which is being recorded, is moved at an appropriate rate depending upon the gradient of the recorded density. In making recordings of the density of various specimens, for example, line spectograms, the speed at which the specimen can be moved is dependent upon the feasibility of obtaining an accurate recording at the portions in which density varies. In most work of this sort, a large portion of the specimen has little or no variation in its density, and therefore, the recording stylus of the instrument makes no appreciable movement, nor does it have any function other than that of indicating that the density does not change. In line spectrograms the larger portion of the specimen is at fog density, and it is only at widely spaced intervals and also at relatively few points along the spectrogram that the recording needle or stylus has to indicate other than the fog density.

It is accordingly an object of this invention to provide a recording densitometer in which the specimen moving carriage may be accelerated at such times as the record shows fog density only, but when an appreciable density gradient is encountered, the speed will be reduced to that necessary for assuring an accurate recording.

It is also an object of the invention to so synchronize the movements of the carriage and the recording part of the instrument that both speed up and slow down together, and thereby obtain a curve of the density of the specimen which, although made at different recording speeds, is, nevertheless, proportionately drawn.

It is a further object of the invention to construct a simple yet efficient mechanism which shall function as an integral part of the densitometer tied in with the circuit of that instrument. In one instance the circuit of the densitometer is so modified that changes in density gradient are simultaneously recorded while the speed of the carriage is altered in the appropriate direction. According to another form of the invention, the speed of the carriage is varied slightly in advance of reaching the point where the gradient of the record changes. As a modification, the speed change may be effected at each and every substantial departure from the fog density level, irrespective of the gradient of the density change. These and other objects of the invention will become more apparent as the disclosure proceeds.

By way of illustration, the invention is described as applied to a recording micro-densitometer in which the densitometer itself is of the well-known type. Connected for operation therewith is a carriage of special construction which is driven in synchronism with the movement of the recording instrument in which suitable paper or other means upon which the record is to be produced, is advanced at a predetermined rate with respect to the movement of the specimen in the carriage. The driving means, preferably an electric motor, is of the variable speed type and should have at least two speeds, one of which is relatively slow while the other is considerably faster. When the densitometer indicates fog density or some other density of zero gradient, the drive for the carriage and recording part of the instrument may be at a maximum. When one of the lines of greater density on the spectrogram or other specimen is encountered, the change in density is employed either in connection with the densitometer circuit or other circuit to vary the speed of the motor or other driving mechanism.

Frequently the spectrograms or other specimens have a number of lines closely adjacent, or there are other variations in density which occur in closely related manner. Under such circumstances, the instrument might not record as accurately as desired since between lines of greater density, the speed of the carriage and recorder would temporarily rise as a result of the leveling of the gradient. In such case, it is desirable to maintain a relatively slow rate of progression for the specimen and for this purpose a suitable time delay mechanism, hereinafter to be described, is incorporated in the control circuit.

Another modification to be described in detail involves an additional circuit by which the density of the specimen is caused to act in advance of the main control circuit to slow down the instrument just before the actual recording of an increase in density gradient occurs.

In the following paragraphs the invention will be disclosed in greater detail by reference to the accompanying drawing in which:

Fig. 2 is a plan view of the mechanism shown in Fig. 1, certain parts being omitted for purposes of clearness.

Fig. 3 is a diagrammatic view of a simple control circuit.

Fig. 4 is a similar diagrammatic view, illustrating a retarding means applied to the circuit of Fig. 3.

Fig. 5 is a fragmentary plan view of the portion of the instrument showing the placement of slits through one of which light is projected for controlling the speed in advance of the indicating and recording functions.

Fig. 6 is a diagrammatic view of a complete circuit employed in the modification of the invention in which the speed change precedes the actual recording of a change in density of a specimen.

Fig. 7 is a diagrammatic view of a modified form of the invention in which speed change is effected whenever density indicated rises substantially above fog density.

Fig. 8 is a plan view showing a typical line spectrogram.

Figure 1:
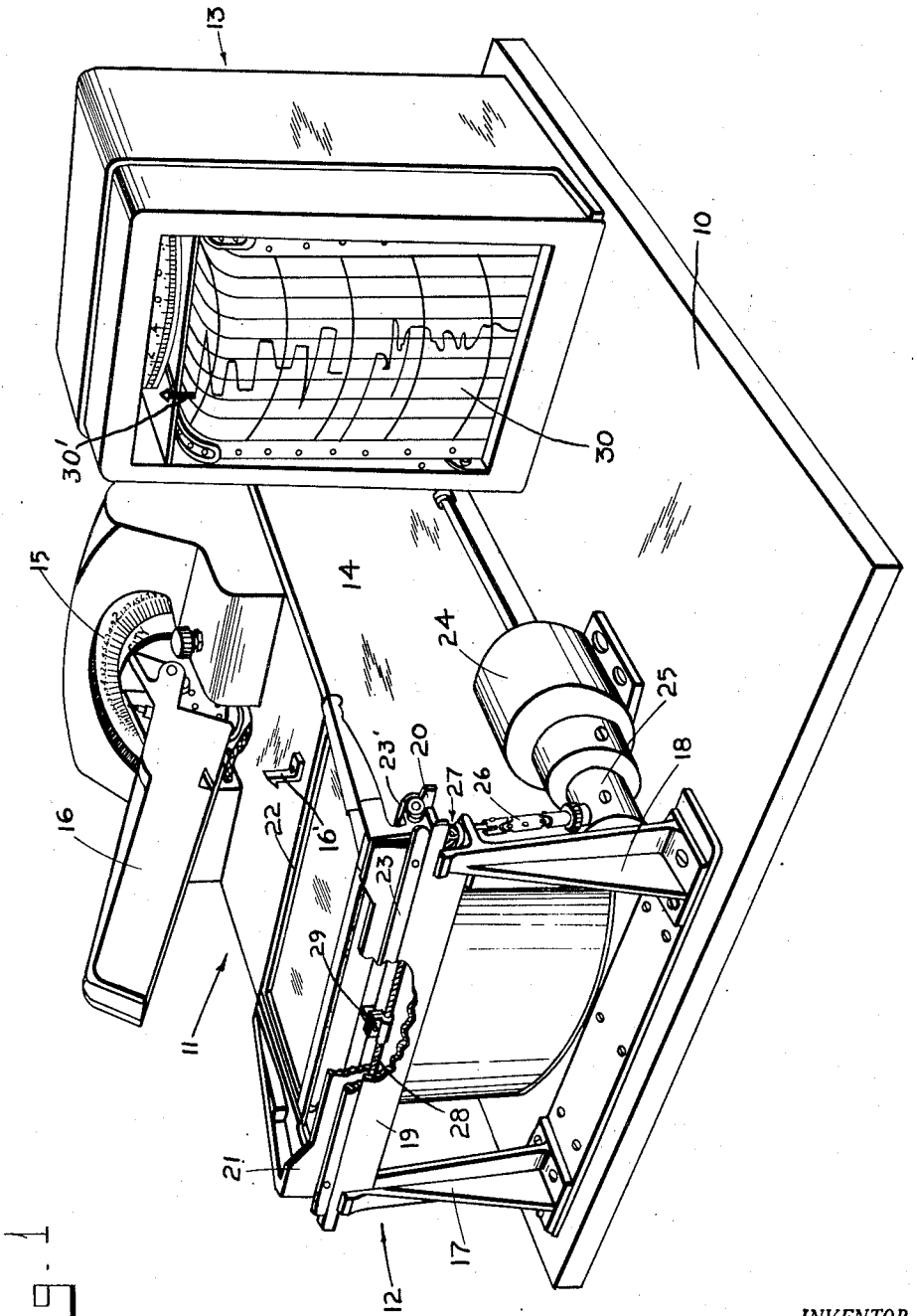
Fig. 1 is a perspective view of one form of the apparatus.

Now referring to Fig. 1, the instrument in general comprises a base or other support 10, a densitometer unit itself generally indicated by numeral 11, a carriage similarly indicated at 12, and the recording part of the instrument at 13. The densitometer includes the casing 14 within which are the illuminating means, the electronic circuit and the indicating meter 15 by means of which the density of any specimen may be shown in appropriate units. A swinging arm 16 carries at its outer end a vacuum phototube which is brought into register with a slit through which light from the illuminating means is projected. The basic instrument is well-known in the field and a full description is not necessary at this point.

The carriage includes upright supports 17 and 18 and horizontal tracks or rails 19 and 20 on which the movable part of the carriage is adapted to slide. The movable portion includes a framework 21 adapted to hold a rectangular frame 22 within which the specimen is inserted and by means of which it is maintained in a plane just above the slit through which light is projected, and between that slit and the light sensitive phototube in the arm 16 when said arm is lowered so that the cell is in appropriate position for receiving light flux passing through the specimen. The movable part of the carriage rests on the tracks 19 and 20 and slides thereon in a straight line motion since the frame 21 projects downwardly to be guided between those tracks, and is supported at appropriate height by a rail 23 and a similar rail 31' cooperating with track 20.

Movement is imparted to the movable carriage by an electric motor 24 fixed on the base 10, and geared to drive both the carriage and the internal parts of the recording instrument 13. The motor 24 is herein illustrated as a shunt-type motor, but it is to be understood that other types may be used, the requisites for such motor being that of constant speed at any particular setting, and in addition thereto, the possibility of varying the speed from a relatively slow one to a speed several times as fast as that slow speed. While an electric motor is probably the most satisfactory means of motive power, other means may be employed, and, of course, the invention is not limited in that respect.

Since the motion of the carriage is relatively slow even at its highest speed, it is preferred to use reduction gearing and to run the motor at reasonable speeds. The reduction gearing may be of any appropriate type and is included in the end housing 25. It is so constructed that a shaft 26 is led off at right angles to the motor center line and power is carried up to a set of spiral gears 27, one at the end of shaft 26 and the other at the end of a threaded screw 28 which runs lengthwise of the carriage support, and having bearings (not shown) at either end of that support, and between the rails 19 and 20. Motion from the screw 28 is imparted to the movable carriage by means of a nut 29 which is attached to a part of that carriage. The nut 29 is preferably of split type, or alternatively, may be a partial nut only, so that it may be disengaged at the end of travel in one direction, whereupon the carriage may be quickly returned to the opposite end of the track preparatory to repeating the function.

The recording instrument 13 is, generally speaking, of the Esterline-Angus ink recording type and has provision for passing a roll or strip of recording paper 30 past a stylus 30' by means of which a line or curve is drawn on the paper in definite relationship to the progression thereof. The internal parts of this instrument have not been shown but, as illustrated in Fig. 2, it is possible to rotate the sprockets over which the paper passes by means of the motor 24, through a shaft 31, miter gears 32 and a shaft 33 which enters at the side of the recorder casing. This recording instrument is one of standard design well known in industry, and has reduction gearing which drives the top sprockets from the power intake at shaft 33. The speed of the motor is naturally much greater than the speed at which the sprockets for the paper are to be driven, therefore reduction gearing is provided within the instrument. The speeds of the recording function and of the progression of the specimen are synchronized to some appropriate values, those being dependent upon the particular type of specimen, the density of which is to be recorded, and on the type of graph which is desired. Once established, the same ratio of speed for the specimen and recording paper will prevail no matter what the speed of the motor 24 may become.

Now that the general aspects of the combined instrument have been briefly described, the invention will be discussed in greater detail by reference to the Figs. 1, 2 and 3. In Fig. 3 the optics of the densitometer and its circuit are schematically illustrated. The circuit is simplified in so far as is possible while showing all essential features and functions thereof. In this figure, the motor and its control circuit including a relay are illustrated in proper relationship to the main densitometer circuit.

A brief description is given here of the elementary optics, as well as the conventional electrical circuit, utilized in the densitometer to serve as a basis for the understanding of the invention. The latter resides in the recording arrangement combining the densitometer, recorder, and means for automatic control of the rate of feed of the specimen. The source of light 34 is aligned with or beneath a slit 35 in the top of casing 14, above which the specimen 36 is traversed. A condenser or other lens 37 serves to concentrate the light on the slit.

A photosensitive vacuum tube 38 is aligned with the slit 35 to receive light transmitted from the source 34 through the specimen 36 after the latter is moved past the slit. The phototube 38 is coupled with an amplifier tube 42, both tubes deriving operating potentials from a suitable source of direct current shown here, by way of example, as a voltage divider resistor 40, the terminals of which with their respective polarities indicated are connected to a direct current supply line 39.

The vacuum tube amplifier circuit is essentially the same as described in U. S. Patent 2,406,716 wherein a logarithmic response is obtained for actuating the indicating instrument, except for the modification in accordance with this invention for effecting simultaneously, with density indication and recording, a control operation for the rate of feed of the specimen. The anode 43 of the tube 41 returns to a suitable tap of the divider 40, and this circuit includes in series the meter 49 and the primary winding of the transformer 56. The latter is part of the specimen feed control circuit, and its function will be more fully explained. The cathode 44 returns to another tap of the divider at a point more negative than the anode return, so that the effective anode voltage is derived between these two taps. The remaining portion of the divider furnishes a bias potential between grid 41 and cathode 44. This bias is applied through the grid resistor 46 and made variable by the potentiometer 47 shunted across the bias portion of the divider 40. The phototube 38 is properly energized in that by direct coupling of its photo-cathode to the grid 41 of the tube 42 the bias resistor 46 serves as the load resistance for the phototube, its anode being connected to a suitable tap on the divider 40. The meter circuit resistor 49′, connected to the divider 40 at a point more positive than the meter, furnishes sufficient current to cancel in the meter the static anode current of the tube 42. In this manner, use is made of the full scale of the instrument for indicating the current variations in the anode circuit.

The moving coil of milliammeter 49 is connected either in series or in parallel with a similar moving coil in the recording instrument which activates the stylus, to draw a line or curve on the paper as it is progressed through the recorder. The curve so drawn shows graphically the values of the density of the specimen at any particular point along its length.

Now referring to the topmost part of the diagram in Fig. 3, the circuit of the motor 24 is shown, including the terminals 51 from which suitable current is derived for the motor. The motor may be of the shunt type having an armature 50 and field winding 54 and controlled to be run at two different speeds, depending upon whether or not a resistance 52 is placed in series in the circuit. This resistance is shunted by the contacts of the relay 53. The latter includes a winding which when energized actuates an armature which closes or opens the shunt path across the resistor 52. The winding 55 is energized from the secondary winding of a transformer 56, the primary winding which is in the anode circuit of vacuum tube 42.

In operation, a specimen, such as a line spectrogram, is clamped in the holder 22 and the carriage is set at its extreme position preparatory to traversing the specimen the length of the carriage travel, or other distance necessitated by the dimensions or other characteristics of the specimen. Of course, the recording instrument is set so that the roll or strip of recording paper is properly threaded through the sprockets, and the instrument itself is assumed to be adjusted to its zero or other preliminary reading.

Power is applied to the motor 24 and the arm 16 housing the phototube is moved into position so that the light sensitive cell will align with the slit through which light is projected for illuminating a very narrow portion of the specimen directly above the slit. The arm 16 has a lock or latch 16′ by which it is held in its lowermost position. Of course, the arm is manually moved to lower position when the instrument is to be used.

Now assuming that a part of the specimen having fog density or a relatively unvarying density is passing the slit, the light impinging on the phototube through the slit will remain at a constant intensity. The anode current of the tube 42 will therefore remain at a substantially constant level as long as there is no change in the light excitation of the phototube. Under such condition, no current will be induced in the secondary winding of the transformer 56 and the winding 55 of the relay 53 is de-energized.

The phototube 38 correspondingly changes the effective grid potential of the tube 42 and the resulting change in anode current flowing through the primary winding of the transformer 56 induces a voltage in the secondary winding which, applied to the winding 55, actuates the relay 53. The shunt around the resistor 52, maintained by the contacts of the relay 53, is thereby removed and the speed of the motor decreased. As long as the density gradient is a substantial one (depending upon the setting of the relay and other factors) the relay will continue to hold the shunt circuit open. When the density gradient levels off, the current will again become constant and the relay being de-energized closes the shunt circuit effectively cutting out the resistor 52 and the motor will run at higher speed.

Now referring to Fig. 4, enough of a circuit similar to that just described by reference to Fig. 3 is shown to illustrate the operation of a retarding device for preventing too sudden return to high speed.

At non-varying densities, the progress of the carriage is speeded up since the relay contacts remain closed. When there is a change in density the speed is greatly reduced, and, of course, changes in density may occur at relatively widely spaced points and then may occur as single lines, or a plurality of such changes may occur with relatively great frequency. Frequent changes of density variations occurring in certain specimens would produce, due to the quick response of the circuit shown in Figure 3, repeated recurring changes in the motor speed. Often it is more desirable to retard the return to high speed for a short interval, thereby to prevent repeated speed changes when there is only a very small area of the unchanging density intervening between two points of changing density during which the speed of the instrument is naturally reduced.

In Fig. 4 parts which correspond to similar parts in Fig. 3 are indicated by the same numerals having primes. The relay as modified in that means is provided for retarding its movement from slow to high speed position.

The armature of the relay is influenced by a dash-pot 57. The construction is such that no resistance is offered to the armature being drawn down by the solenoid. Obviously, there is no delay when going from high to low speed. For the reverse, the dash-pot offers a delay which may be regulated and by which the closing of the shunt circuit 54′ occurs after a predetermined time interval.

Now referring to Figs. 5 and 6, a still further modification will be described, in which two light slits and two independent circuits are employed so as to slow down the carriage and recorder prior to the actual recording of the change in density for which the lower speed is required. In Fig. 5 the densitometer casing 14' has one slit 58 through which light passes to reach the light cell employed as in the device above-described. A second light cell is employed and that, preferably carried by a modified or extended arm, such as the arm 16, is aligned with and overlies a second slit 59. This extended arm merely provides for housing two phototubes and their connected wiring rather than the one tube of that type carried by arm 16. In Fig. 5 the width of the slits is greatly exaggerated as is also the actual offset or lead of slit 59 over slit 58. In fact, they are adjusted as to their width and also as to the lead, the latter adjustment being for the purpose of varying the actual time interval by which the slowing down of the carriage and recorder is to precede the recording of the density responsible for the change of speed.

The arrangement shown in Figure 6 essentially separates the two functions which the circuits, described in Figures 3 and 4, are called upon to produce. The recording or indicating of the density of the specimen is performed by one circuit comprising the photoelectric system shown in the bottom of the figure, whereas the sensing function of the density variations for the purpose of speed control of the specimen feed is performed by the photoelectric circuit shown in the upper portion of Figure 6. The two circuits, each with their own phototube and optical systems, are photoelectrically separated, but closely inter-related physically. The slits 58 and 59, as seen in Figures 2 and 5, are placed side by side and the specimen to be analyzed performs the intercoupling between the two circuits.

The densitometer circuit, per se, comprising the phototube 63 and its amplifier tube 65 and the elementary optics shown by light source 60, condenser 61, slit 58, is the same as described in U. S. Patent 2,406,716, referred to above. The indicator 66 in the present arrangement may be the recording type meter 13 if only recording and no visual indication of the instant specimen is desired. The function of this circuit, as far as density indication is concerned, is essentially the same as described in connection with Figure 3.

The sensing function to control the specimen feeding meter is performed by the circuit coupled to phototube 69 which receives the light modified by the opacity of the specimen from source 67 by way of the optics, such as lens 68 and slit 59.

Since the main purpose of this circuit is to control the relay, which in turn controls the motor speed, the vacuum tube 27 and its circuit components need not be identical with the one associated with the phototube 63 where a logarithmic response governs the design parameters. For the control action, only anode circuit variations in the primary winding of transformer 76 are needed, and with the two circuits separated, a more efficient speed control can be effected by the proper choice of tube characteristics and circuit constants. The motor circuit is essentially the same as in Figure 3. The relay 75 has its winding 74 connected to the secondary of the transformer 76 and the contacts of the relay when closed shunt the series resistor 52'. Change in density in the specimen which may reach the phototube 69 prior to arriving to energize phototube 63 due to the physical placement of the slits 58 and 59 will initiate anode current in the tube 72 pulsing thereby the transformer 76. The relay 75, thus being energized, inserts the resistor 52' thereby reducing the motor speed. In other words, the density variations to be recorded are sensed, and the specimen will have a slow rate of travel, just as the portion actuating the sensed circuit arrives at the slits 58 and 59 for qualitative densitometric analysis. The time difference between sense and measurement may be controlled by adjustment of the relative placement of the slits 58 and 59, and a delayed return to fast speed may also be of advantage as shown in Figure 4 in which case relay 75 is of the slow release type.

While the circuits above described are distinct circuits in one sense of the term, they function in a particular manner to produce a unitary result, since the specimen 62 moved by the carrier along past apertures 58 and 59 attenuates light which strikes both phototubes 63 and 69. The control circuit, that forming the upper part of Fig. 6, is first affected by a particular density portion of the specimen. That same density portion of the specimen as the carriage moves past the apertures, will later affect the measuring and recording circuit which is shown at the lower part of Fig. 6. As above explained, a change of speed is then effected before the recording of that change in density responsible for the speed change. By this refinement, the record is more smoothly and more accurately produced and the movements of the recording instrument, especially the stylus thereof, occur at speeds for which the mechanism may be more easily designed.

In Fig. 8, a typical line spectrogram 86 is shown having several extended areas 87 which are at fog density, and between these areas, there are lines of varying density greater than fog density. These lines may be of different thickness and in certain instances, several lines may occur in closely spaced relationship.

Now referring to Fig. 7, a modification is to be described in which the change to a slower speed is brought about every time the recorded density reaches a predetermined value greater than fog density. By predetermined value, it is meant that the change is effected upon encountering a density significantly greater than fog or other lowest recorded density, and for any given installation, one which is sufficient to require a speed reduction if an accurate record is to be made. Thus, this form of the invention functions in accordance with actual values of density in the specimen rather than upon each and every change in gradient encountered.

The circuit shown is similar to those previously described except for the type and character of the relay 80. In the previously described arrangement, a change in density has been the controlling factor, and, at no variation of density irrespective of the density value, the specimen moved past the slit at the higher speed. In certain applications it is desirable to obtain speed control at and above a predetermined density value, instead of change in density. For this mode of operation the effective value of anode current is utilized for motor control purposes. A direct current relay 80 is placed in the anode circuit of the tube 79 forming a branch circuit with the indicating instrument. The desired density level for the operation of the relay 80 may be selected by the rider 82 connected to the voltage divider 78 which, in effect, determines the branch circuit current for the relay.

The relay 80 determines whether or not current is to pass through the shunt line 83 or through resistance 84 in its pathway to a motor not shown in this figure, but similar to those heretofore described. Current is supplied at 85.

In operation, at fog density and at densities slightly above that, or above any other prevailing minimum, the relay is effective in shunting current around resistance 84. That provides high speed operation. When density of a predetermined value above the minimum affects tube 77, the anode current in the relay circuit drops and relay 80 releases its armature, opening the shunt line, the motor then functioning at its low speed until the density is such that the relay again changes it to its higher value.

In place of the phototube of simple type mentioned heretofore, an electron multiplier tube may be substituted. The triode amplifier may be replaced by other electronic elements of similar nature, but of greater amplifying power or of different characteristics depending upon specific performance to be met in different instances.

While the invention has been described by reference to a more or less specific disclosure of a preferred form and certain modifications, that description is illustrative only and it is to be understood that the invention concept may be carried out in a number of ways. This application is, therefore, not to be limited to the precise details described, but is intended to cover all variations and modifications thereof falling within the spirit of the invention and the scope of the claims.

I claim:

1. In an arrangement for measuring and progressively recording the density of a specimen material throughout a predetermined portion thereof, a photoelectric density indicating and recording apparatus including a phototube, a recorder having a movable chart upon which density vales of said specimen under analysis are recorded, means for moving said chart and simultaneously feeding said specimen past said phototube and control means for varying the rate of said feed in accordance with changes of density.

2. In an arrangement for measuring and progressively recording the density of a specimen material throughout a predetermined portion thereof, a photoelectric density indicating and recording apparatus including a phototube, a recorder having a movable chart upon which density values of said specimen under analysis are recorded, means for moving said chart and simultaneously feeding said specimen past said phototube and control means for varying the rate of said feed in accordance with the density gradient of said specimen.

3. In an arrangement for measuring and progressively recording the density of a specimen material throughout a predetermined portion thereof, a photoelectric density indicating and recording apparatus including a phototube, a recorder having a movable chart upon which density values of said specimen under analysis are recorded, means for moving said chart and simultaneously feeding said specimen past said phototube including an electric motor and control means for varying the speed of said motor in accordance with changes of density.

4. In an arrangement for measuring and progressively recording the density of a specimen material throughout a predetermined portion thereof, a photoelectric density indicating and recording apparatus including a phototube, a vacuum tube amplifier responsive to current variations of said phototube, a recorder having a movable chart upon which density values of said specimen under analysis are recorded, means for moving said chart and simultaneously feeding said specimen past said phototube including an electric motor and control means for varying the speed of said motor in accordance with the response of said amplifier.

5. In an arrangement for measuring and progressively recording the density of a specimen material throughout a predetermined portion thereof, a photoelectric density indicating and recording apparatus including a phototube, a recorder comprising a movable chart upon which density values of said specimen under analysis are recorded, a stylus cooperating with said chart, direct current responsive means for actuating said stylus, a direct current amplifier coupled to said phototube, an output circuit for said amplifier, stylus moving means and an alternating current responsive means in said circuit, means for moving said chart and simultaneously feeding said specimen past said phototube and control means including said alternating current responsive means for varying the rate of said feed.

6. In an arrangement for measuring and progressively recording the density of a specimen material throughout a predetermined portion thereof, a photoelectric density indicating and recording apparatus including a phototube, a recorder comprising a movable chart upon which density values of said specimen under analysis are recorded, a stylus cooperating with said chart, direct current responsive means for actuating said stylus, a direct current amplifier coupled to said phototube, an output circuit for said amplifier including said stylus moving means and the primary winding of a transformer, means for moving said chart and simultaneously feeding said specimen past said phototube and control means connected to the secondary winding of said transformer for varying the rate of said feed.

7. In an arrangement for measuring and progressively recording the density of a specimen material throughout a predetermined portion thereof, a photoelectric density indicating and recording apparatus including a phototube, a recorder comprising a movable chart upon which density values of said specimen under analysis are recorded, a stylus cooperating with said chart, direct current responsive means for actuating said stylus, a direct current amplifier coupled to said phototube, an output circuit for said amplifier including said stylus moving means and the primary winding of a transformer, an electric motor for moving said chart and simultaneously feeding said specimen past said phototube, a circuit for said motor and control means for varying the speed of said motor and thereby the rate of said feed, comprising a resistance in said motor circuit, a relay connected to the secondary winding of said transformer and a pair of contacts for said relay connected in shunt with said resistance.

8. In an arrangement for measuring and progressively recording the density of a specimen material throughout a predetermined portion thereof, a photoelectric density indicating and recording apparatus including a phototube, a recorder having a movable chart upon which density variations of said specimen under analysis are recorded, motor means having two selectable speeds for moving said chart and simultaneously feeding said specimen past said phototube and selector means responsive to the density gradient of said specimen for selecting one of said speeds at a uniform density and another of said speeds at a varying density.

9. In an arrangement for measuring and progressively recording the density of a specimen material throughout a predetermined portion thereof, a photoelectric density indicating and recording apparatus including a phototube, a recorder having a movable chart upon which density variations of said specimen under analysis are recorded, motor means having two selectable speeds, one high and one low, for moving said chart and simultaneously feeding said specimen past said phototube and selector means responsive to the density gradient of said specimen for selecting the high speed at a uniform density and the low speed at a varying density.

10. In an arrangement for measuring and progressively recording the density of a specimen material throughout a predetermined portion thereof, a photoelectric density indicating and recording apparatus including a phototube, a recorder having a movable chart upon which density variations of said specimen under analysis are recorded, motor means having two selectable speeds, on high and one low, for moving said chart and simultaneously feeding said specimen past said phototube and selector means responsive to the density gradient of said specimen for selecting the high speed at a uniform density and the low speed at a varying density, and a retard mechanism actuated by said selector means delaying the transfer from said low speed to said high speed upon change from varying to uniform density.

11. In an arrangement for measuring and progressively recording the density of a specimen material throughout a predetermined portion thereof, a photoelectric density indicating and recording apparatus including a density measuring phototube, a recorder having a movable chart upon which density values of said specimen under analysis are recorded, means for moving said specimen past said phototube comprising an electric motor having two selectable speeds, a selector for said speeds, a sensing circuit including a sensing phototube alongside said first phototube and placed ahead in the path of said moving specimen, means in said circuit responsive to changes in said sensing phototube current for actuating said selector whereby the rate of feed of said specimen past said density measuring phototube is determined in accordance with the density gradient of said material prior to reaching said last mentioned phototube.

12. In an arrangement for measuring and progressively recording the density of a specimen material throughout a predetermined portion thereof, a photoelectric density indicating and recording apparatus including a density measuring phototube, a recorder having a movable chart upon which density values of said specimen under analysis are recorded, means for moving said specimen past said phototube comprising an electric motor having high and low speeds, a selector for said speeds, a sensing circuit including a sensing phototube alongside said first phototube and placed ahead in the path of said moving specimen, means in said circuit responsive to changes in said sensing phototube current for actuating said selector whereby the feed of said specimen past said density measuring phototube is selected upon variation in the density of said material to said low speed prior to reaching said last mentioned phototube and selected to said high speed upon uniform density thereof.

13. In a recording densitometric measuring system, a phototube and circuit therefore, a recording stylus actuated in accordance with the current in said circuit, a chart cooperating said said stylus, a holder for a specimen the density of which is to be recorded over a predetermined area, means for moving said holder past said phototube comprising a variable speed electric motor, and control means for changing the speed of said motor at a preselected magnitude of said current.

14. In a recording densitometric measuring system, a phototube and circuit therefore, a recording stylus actuated in accordance with the current in said circuit, a chart cooperating with said stylus, a holder for a specimen the density of which is to be recorded over a predetermined area, means for moving said holder past said phototube comprising a two speed electric motor, and control means for changing the speed of said motor at a preselected magnitude of said current from a first speed to a second speed and maintaining said second speed at current values above said selected magnitude and automatically changing to said first speed at current values below said selected magnitude.

MONROE H. SWEET.

REFERENCES CITED

The following references are of record in the file of this patent:

UNITED STATES PATENTS

| Number | Name | Date |
| --- | --- | --- |
| 1,850,909 | Bahney | Mar. 22, 1932 |
| 1,896,547 | Leece et al. | Feb. 7, 1933 |
| 2,076,554 | Drinker et al. | Apr. 13, 1937 |